(12) United States Patent
Chen (10) Patent No.: US 10,747,048 B2
(45) Date of Patent: Aug. 18, 2020

(54) COLOR FILTER SUBSTRATE AND METHOD FOR MANUFACTURING THE SAME

(71) Applicants: HKC Corporation Limited, Shenzhen, Guangdong (CN); Chongqing HKC Optoelectronics Technology Corporation Limited, Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CORPORATION LIMITED, Chongqing (CN)

( * ) Notice: Subject to any disclaimer, the term of this patent is extended or adjusted under 35 U.S.C. 154(b) by 498 days.

(21) Appl. No.: 15/540,985

(22) PCT Filed: Apr. 28, 2017

(86) PCT No.: PCT/CN2017/082367
§ 371 (c)(1),
(2) Date: Jun. 29, 2017

(87) PCT Pub. No.: WO2018/188129
PCT Pub. Date: Oct. 18, 2018

(65) Prior Publication Data
US 2019/0391445 A1 Dec. 26, 2019

(30) Foreign Application Priority Data

Apr. 12, 2017 (CN) .......................... 2017 1 0237326

(51) Int. Cl.
*G02F 1/1335* (2006.01)
*G02F 1/1343* (2006.01)
*G02F 1/1362* (2006.01)

(52) U.S. Cl.
CPC .... *G02F 1/133516* (2013.01); *G02F 1/13439* (2013.01); *G02F 1/133512* (2013.01); *G02F 1/136209* (2013.01)

(58) Field of Classification Search
None
See application file for complete search history.

(56) References Cited

U.S. PATENT DOCUMENTS 4,867,537 A * 9/1989 Aoki ................. G02F 1/133512
349/111
6,099,993 A * 8/2000 Kim .................. G02F 1/133512
430/7
(Continued)

FOREIGN PATENT DOCUMENTS

CN 101013174 A 8/2007
CN 101329465 A 12/2008
(Continued)

*Primary Examiner* — Ryan Crockett
(74) *Attorney, Agent, or Firm* — Juan Carlos A. Marquez; Marquez IP Law Office, PLLC (57) ABSTRACT

This application relates to a color filter (CF) substrate and a method for manufacturing the same. The manufacturing method includes: providing a first substrate; disposing a conductive layer on the first substrate; disposing a light-shielding layer on the conductive layer; patterning the light-shielding layer to expose a part of the conductive layer, and forming a light-shielding layer including a plurality of recessed portions with different thicknesses on the conductive layer; and etching the conductive layer and the light-shielding layer to cover the conductive layer with the light-shielding layer, forming a plurality of through-holes in the light-shielding layer, and defining, by the conductive layer and the light-shielding layer, a plurality of pixel display areas; disposing a CF layer on the pixel display areas; and disposing a transparent electrode layer on the light-shielding layer and the CF layer, where the transparent (Continued)

electrode layer covers the through-holes, and is communicated with the conductive layer.

7 Claims, 7 Drawing Sheets

(56) References Cited

U.S. PATENT DOCUMENTS

2014/0347610 A1* 11/2014 Han ................ G02B 5/201
                                                                             349/106
2018/0321547 A1* 11/2018 Li ................... G02F 1/1335

FOREIGN PATENT DOCUMENTS

| CN | 103257476 A | 8/2013 |
| CN | 104076551 A | 10/2014 |
| CN | 105467665 A | 4/2016 |

* cited by examiner

COLOR FILTER SUBSTRATE AND METHOD FOR MANUFACTURING THE SAME

BACKGROUND

Technical Field

This application relates to a color filter (CF) substrate and a method for manufacturing the same, and in particular, to a CF substrate capable of reducing a resistance value of a transparent electrode layer and a method for manufacturing the same.

Related Art

With progress of science and technologies, liquid crystal displays with a plurality of advantages, such as power saving, no radiation, small volumes, low power consumption, flat squares, high resolution, and stable picture quality, in particular, various current information products, such as mobile phones, notebook computers, digital cameras, PDAs, and liquid crystal screens, are increasingly popular. As a result, demands for liquid crystal displays (LCD) are greatly increased. Therefore, thin film transistor liquid crystal displays (TFT-LCDs) that have a high-resolution pixel design satisfying increasing demand and that have advantageous characteristics, such as high picture quality, good space utilization, low power consumption, and no radiation, have become a mainstream of the market. A thin film transistor (TFT) substrate is one of the important components of a liquid crystal display.

The TFT-LCD is a backlight liquid crystal display, and includes a liquid crystal display panel and a backlight module. The liquid crystal display panel includes: a first substrate, which is a TFT substrate; a second substrate, which is a CF substrate; and liquid crystals (LCs) sandwiched between the CF substrate and the TFT substrate. A resistance value of a transparent electrode layer (ITO) of the CF substrate is relatively great. As a result, a transparent electrode layer signal of the CF substrate is unstable. During display of the TFT-LCD, the transparent electrode layer signal is likely to be adversely affected by crosstalk of a data line signal and a scan line signal. Consequently, display quality of the TFT-LCD is affected.

SUMMARY

To resolve the foregoing technical problem, an objective of this application is to provide a CF substrate and a method for manufacturing the same, and in particular, provide a CF substrate capable of reducing a resistance value of a transparent electrode layer and a method for manufacturing the same. The resistance value of the transparent electrode layer may be reduced, and stability of a voltage of the transparent electrode layer is improved, thereby improving display quality.

The objective of this application is achieved and a technical problem thereof is resolved by using the following technical solutions. A method for manufacturing a CF substrate provided according to this application comprises: providing a first substrate; disposing a conductive layer on the first substrate; disposing a light-shielding layer on the conductive layer; patterning the light-shielding layer to expose a part of the conductive layer, and forming a light-shielding layer comprising a plurality of recessed portions with different thicknesses on the conductive layer; etching the conductive layer and the light-shielding layer to cover the conductive layer with the light-shielding layer, forming a plurality of through-holes in the light-shielding layer, and defining, by the conductive layer and the light-shielding layer, a plurality of pixel display areas; disposing a CF layer on the pixel display areas; and disposing a transparent electrode layer on the light-shielding layer and the CF layer, where the transparent electrode layer covers the through-holes, and is communicated with the conductive layer.

In an embodiment of this application, the conductive layer is etched by using a wet etching method, so that the etched conductive layer is covered with the light-shielding layer.

In an embodiment of this application, the recessed portions of the light-shielding layer are etched by using a dry etching method to form the through-holes and expose the conductive layer.

In an embodiment of this application, a plurality of first photoresists, second photoresists, and third photoresists are disposed as an array on the pixel display areas, and are the CF layer.

In an embodiment of this application, the through-holes are arranged as an array between photoresists of a same color.

In an embodiment of this application, the through-holes are arranged as an array between photoresists of different colors.

In an embodiment of this application, the light-shielding layer is a black matrix layer.

Another objective of this application is to provide a CF substrate, comprising: a first substrate; a conductive layer, disposed on the first substrate; a light-shielding layer, disposed on the conductive layer and covering the conductive layer, where the light-shielding layer includes a plurality of through-holes, the through-holes expose the conductive layer, and the conductive layer and the light-shielding layer define a plurality of pixel display areas; a CF layer, comprising a plurality of first photoresists, second photoresists, and third photoresists that are disposed as an array on the pixel display areas; and a transparent electrode layer, disposed on the light-shielding layer and the CF layer, where the transparent electrode layer covers the through-holes, and is communicated with the conductive layer.

In an embodiment of this application, the conductive layer is a metal layer.

In an embodiment of this application, the conductive layer and the CF layer are disposed adjacent to each other, and surround the first photoresists, the second photoresists, and the third photoresists.

In an embodiment of this application, the through-holes are configured with equal widths, partly equal widths, or unequal widths.

In an embodiment of this application, the through-holes are located between photoresists of a same color.

In an embodiment of this application, the through-holes are located between photoresists of different colors.

In an embodiment of this application, the light-shielding layer is a black matrix layer.

Still another objective of this application is to provide a display panel, comprising: an active switch array substrate and a CF substrate, where the CF substrate comprises: a first substrate; a conductive layer, disposed on the first substrate; a light-shielding layer, disposed on the conductive layer and covering the conductive layer, where the light-shielding layer includes a plurality of through-holes, the through-holes expose the conductive layer, and the conductive layer and the light-shielding layer define a plurality of pixel display areas; a CF layer, comprising a plurality of first photoresists, second photoresists, and third photoresists that are disposed as an array on the pixel display areas;

and a transparent electrode layer, disposed on the light-shielding layer and the CF layer, where the transparent electrode layer covers the through-holes; and the transparent electrode layer is communicated with the conductive layer by using the through-holes, and covers the CF substrate.

In an embodiment of this application, the first photoresists are red photoresists, the second photoresists are green photoresists, and the third photoresists are blue photoresists;

In an embodiment of this application, the through-holes are configured with equal widths, partly equal widths, or unequal widths.

In this application, the transparent electrode layer is communicated with the conductive layer. Therefore, a resistance value of the transparent electrode layer may be reduced, and stability of a voltage of the transparent electrode layer is improved, thereby improving display quality.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface", merely refer to directions of the accompanying drawings. Therefore, the used terms about directions are used to describe and understand this application, and are not intended to limit this application.

The accompanying drawings and the description are considered to be essentially illustrative, rather than limitative. In figures, units with similar structures are represented by using a same reference number. In addition, for understanding and ease of description, a size and a thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe the technical measures and functions used in the this application for achieving the predetermined objectives, specific implementations, structures, features, and functions of a CF substrate and a method for manufacturing the same that are provided in this application are described below in detail with reference to the accompanying drawings and preferred embodiments.

In an embodiment, a liquid crystal display panel in this application may be a curved-surface display panel.

Figure 1:
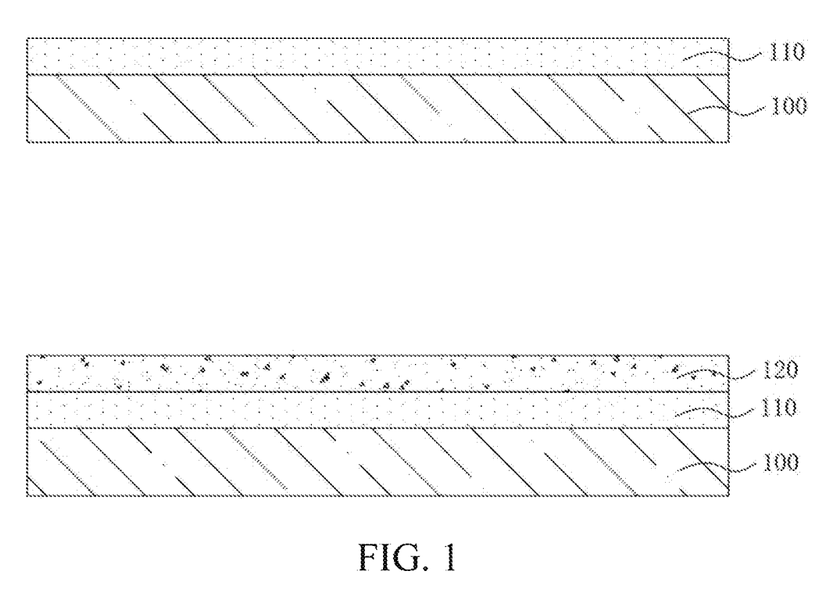
FIG. 1 to FIG. 4 are schematic diagrams of a method for manufacturing a CF substrate according to an embodiment of this application.
Figure 2:
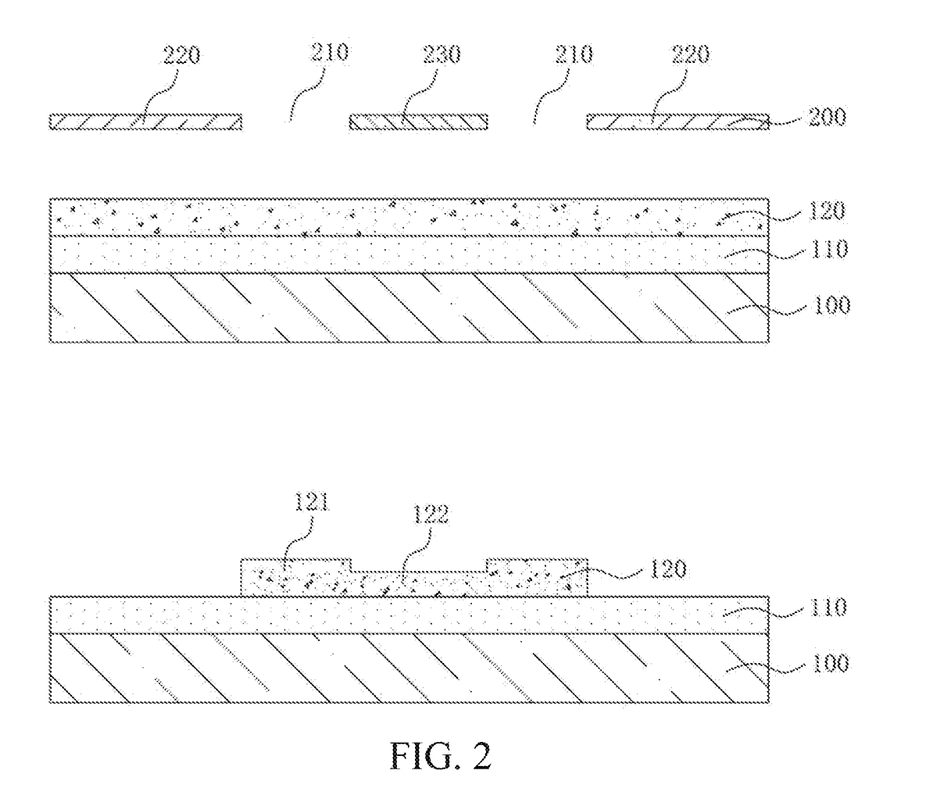
Figure 3A:
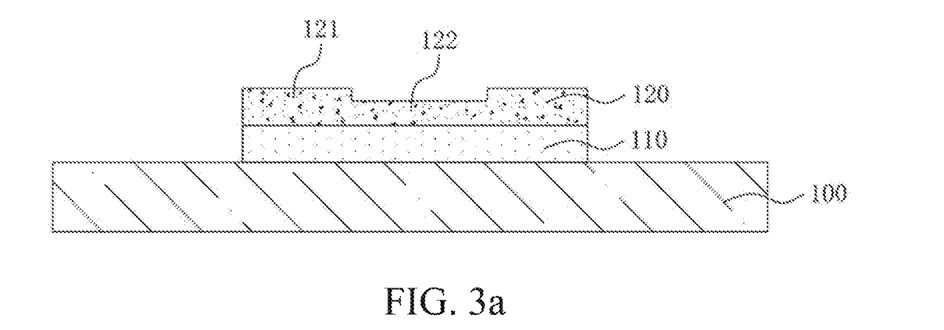
Figure 3B:
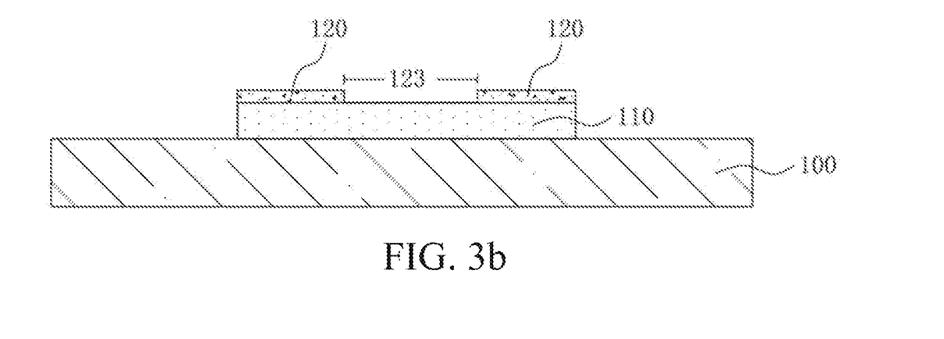
Figure 4:
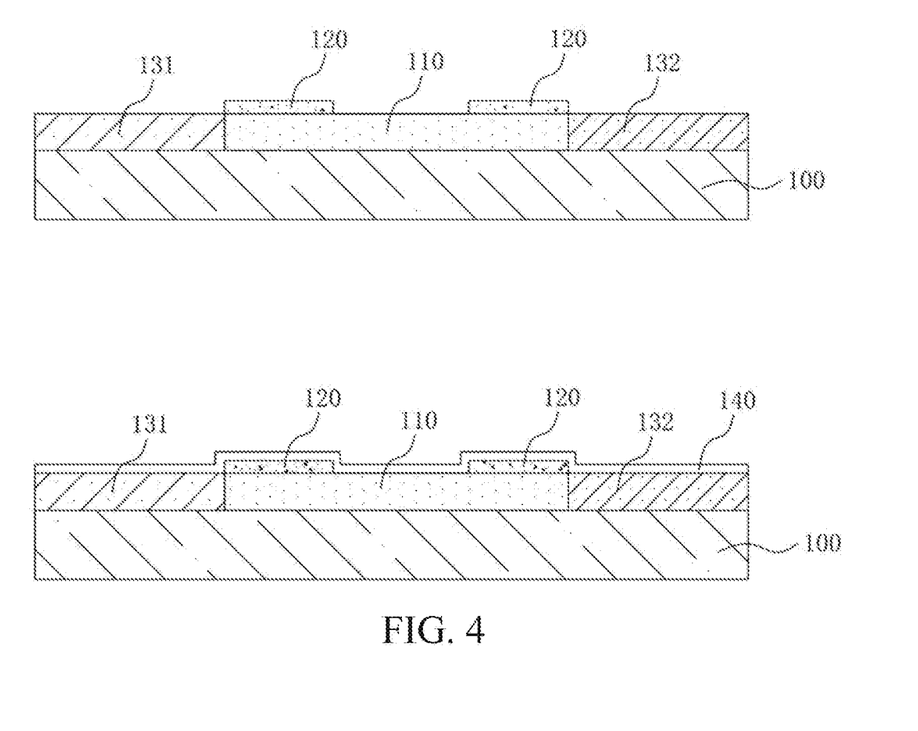

FIG. 1 to FIG. 4 are schematic diagrams of a method for manufacturing a CF substrate according to an embodiment of this application. Referring to FIG. 1 to FIG. 4, a method for manufacturing a CF substrate includes:

providing a first substrate 100, disposing a conductive layer 110 on the first substrate 100, and disposing a light-shielding layer 120 on the conductive layer 110 (as shown in FIG. 1);

patterning the light-shielding layer 120 by performing procedures, such as exposure and development, with a mask 200 to expose a part of the conductive layer 110, and forming a light-shielding layer 120 including a plurality of recessed portions with different thicknesses on the conductive layer 110, where the light-shielding layer includes at least a protruding portion 121 of a first thickness and a recessed portion 122 of a second thickness (as shown in FIG. 2);

etching the conductive layer 110 and the light-shielding layer 120 to cover the conductive layer 110 with the light-shielding layer 120, forming a plurality of through-holes 123 in the light-shielding layer 120, and defining, by the conductive layer 110 and the light-shielding layer 120, a plurality of pixel display areas (as shown in FIG. 3a and FIG. 3b); and disposing a CF layer on the pixel display areas, and disposing a transparent electrode layer 140 on the light-shielding layer 110 and the CF layer, where the transparent electrode layer 140 covers the through-holes 123, and is communicated with the conductive layer 120 (as shown in FIG. 4).

In an embodiment of this application, the etching method includes a wet etching method and a dry etching method. The conductive layer 110 is etched by using the wet etching method, so that the conductive layer 110 is covered with the light-shielding layer 120 (as shown in FIG. 3a). The light-shielding layer 120 is etched by using the dry etching method. The through-holes 123 are formed in the conductive layer 110 by using structural designs of the protruding portion 121 and the recessed portion 122 to expose the conductive layer 110 (as shown in FIG. 3b).

In an embodiment of this application, a plurality of first photoresists 131, second photoresists 132, and third photoresists (not shown in the figure) are disposed as an array on the pixel display areas, and are the CF layer.

In an embodiment of this application, the through-holes 123 are arranged as an array between photoresists of a same color.

In an embodiment of this application, the through-holes 123 are arranged as an array between photoresists of different colors.

In an embodiment of this application, the light-shielding layer 120 may be, for example, a black matrix layer.

In an embodiment of this application, the mask 200 may be, for example, a halftone mask, and has at least one transparent area 210, a light-shielding area 220, and a translucent area 230. The light-shielding layer 120 including a plurality of recessed portions with different thicknesses is formed on the conductive layer 110 by using the mask 200, to facilitate a subsequent panel manufacturing process.

Figure 5:
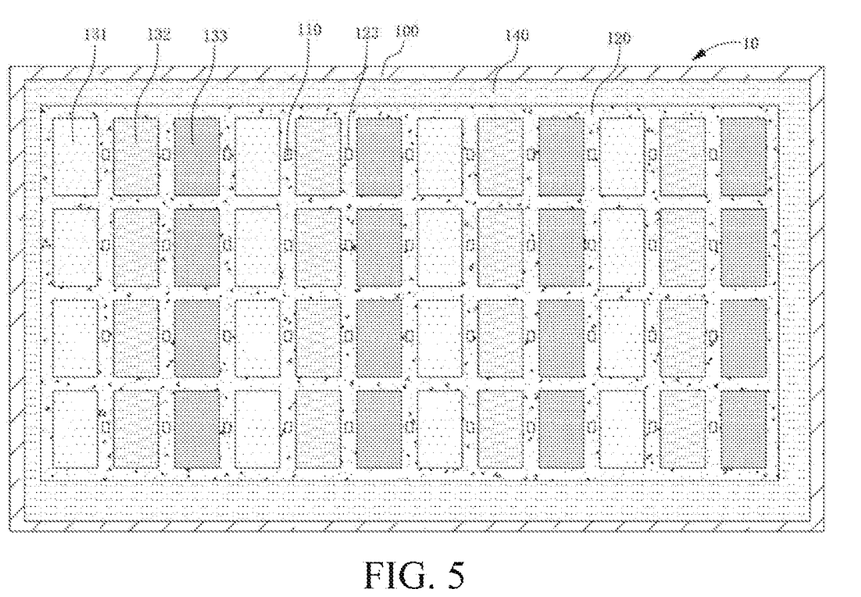
FIG. 5 is a top view of a CF substrate according to an embodiment of this application.

FIG. 5 is a top view of a CF substrate according to an embodiment of this application. Referring to FIG. 4 and FIG. 5, a CF substrate 10 includes: a first substrate 100; a conductive layer 110, disposed on the first substrate 100; a light-shielding layer 120, disposed on the conductive layer 110, and covering the conductive layer 120, where the light-shielding layer 120 includes a plurality of through-holes 123, the through-holes 123 expose the conductive layer 110, and the conductive layer 110 and the light-shielding layer 120 define a plurality of pixel display areas; a CF layer, including a plurality of first photoresists 131, second photoresists 132, and third photoresists 133 that are disposed as an array on the pixel display areas; and a transparent electrode layer 140, disposed on the light-shielding layer 120 and the CF layer, where the transparent electrode layer 140 covers the through-holes 123, and is communicated with the conductive layer 110.

In an embodiment of this application, the conductive layer 110 may be, for example, a metal layer having low resistivity.

In an embodiment of this application, the light-shielding layer 120 may be, for example, a black matrix layer.

In an embodiment of this application, the conductive layer 110 and the CF layer are disposed adjacent to each other, and surround the first photoresists 131, the second photoresists 132, and the third photoresists 133.

In an embodiment of this application, the first photoresists 131 may be, for example, red photoresists, the second photoresists 132 may be, for example, green photoresists, and the third photoresists 133 may be, for example, blue photoresists.

In an embodiment of this application, the through-holes 123 are configured with equal widths, partly equal widths, or unequal widths.

In an embodiment of this application, the through-holes 123 are located between photoresists of different colors. Specifically, the through-holes 123 are located between the first photoresists 131 and the second photoresists 132. The through-holes 123 are located between the second photoresists 132 and the third photoresists 133. The through-holes 123 are located between the third photoresists 133 and the first photoresists 131.

Figure 6:
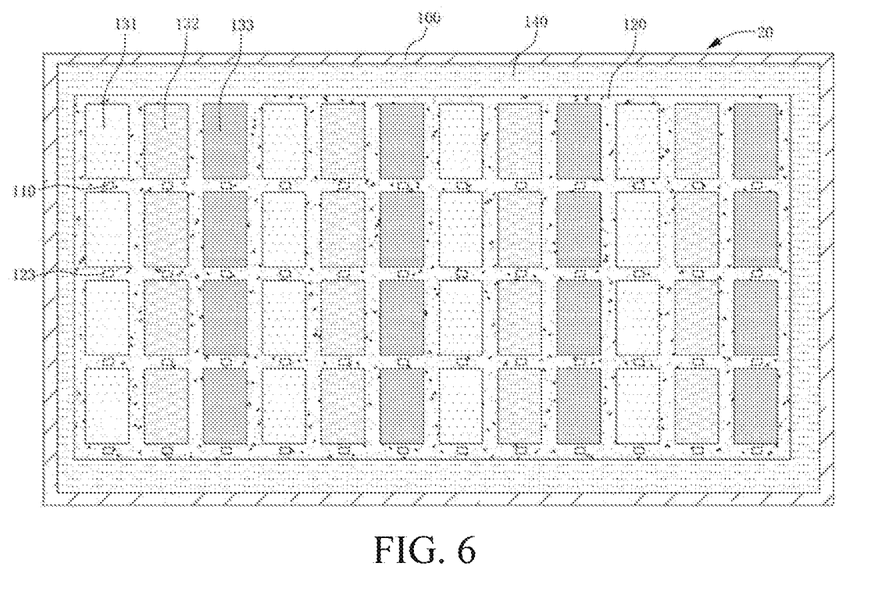
FIG. 6 is a top view of a CF substrate according to another embodiment of this application.

FIG. 6 is a top view of a CF substrate according to another embodiment of this application. Referring to FIG. 4 and FIG. 6, a CF substrate 20 includes: a first substrate 100; a conductive layer 110, disposed on the first substrate 100; a light-shielding layer 120, disposed on the conductive layer 110 and covering the conductive layer 120, where the light-shielding layer 120 includes a plurality of through-holes 123, the through-holes 123 expose the conductive layer 110, and the conductive layer 110 and the light-shielding layer 120 define a plurality of pixel display areas; a CF layer, including a plurality of first photoresists 131, second photoresists 132, and third photoresists 133 that are disposed as an array on the pixel display areas; and a transparent electrode layer 140, disposed on the light-shielding layer 120 and the CF layer, where the transparent electrode layer 140 covers the through-holes 123, and is communicated with the conductive layer 110.

In an embodiment of this application, the conductive layer 110 may be, for example, a metal layer having low resistivity.

In an embodiment of this application, the light-shielding layer 120 may be, for example, a black matrix layer.

In an embodiment of this application, the conductive layer 110 and the CF layer are disposed adjacent to each other, and surround the first photoresists 131, the second photoresists 132, and the third photoresists 133.

In an embodiment of this application, the first photoresists 131 may be, for example, red photoresists, the second photoresists 132 may be, for example, green photoresists, and the third photoresists 133 may be, for example, blue photoresists.

In an embodiment of this application, the through-holes 123 are configured with equal widths, partly equal widths, or unequal widths.

In an embodiment of this application, the through-holes 123 are located between photoresists of a same color. Specifically, the through-holes 123 are located between first photoresists 131 that are adjacent to each other. The through-holes 123 are located between second photoresists 132 that are adjacent to each other. The through-holes 123 are located between third photoresists 133 that are adjacent to each other.

Figure 7:
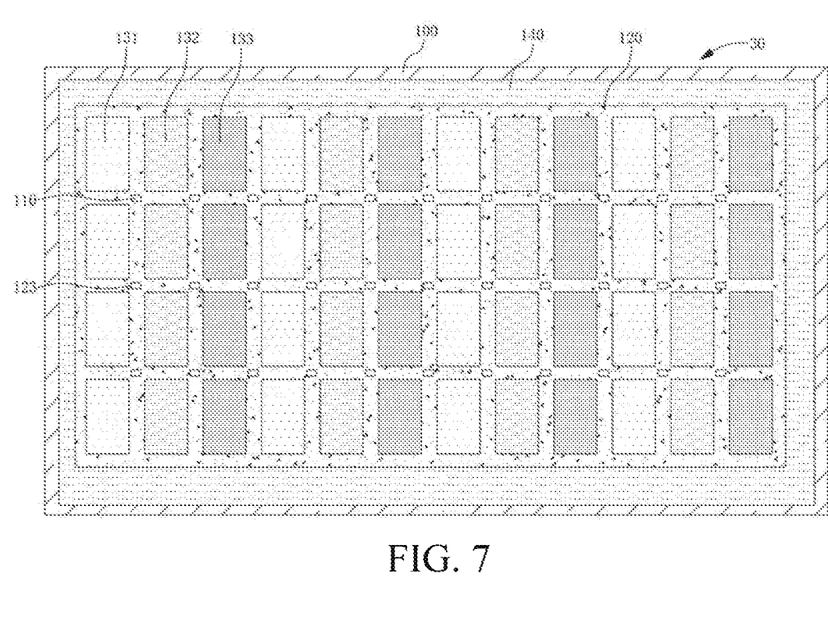
FIG. 7 is a top view of a CF substrate according to still another embodiment of this application.

FIG. 7 is a top view of a CF substrate according to still another embodiment of this application. Referring to FIG. 4 and FIG. 7, a CF substrate 30 includes: a first substrate 100; a conductive layer 110, disposed on the first substrate 100; a light-shielding layer 120, disposed on the conductive layer 110 and covering the conductive layer 120, where the light-shielding layer 120 includes a plurality of through-holes 123, the through-holes 123 expose the conductive layer 110, and the conductive layer 110 and the light-shielding layer 120 define a plurality of pixel display areas; a CF layer, including a plurality of first photoresists 131, second photoresists 132, and third photoresists 133 that are disposed as an array on the pixel display areas; and a transparent electrode layer 140, disposed on the light-shielding layer 120 and the CF layer, where the transparent electrode layer 140 covers the through-holes 123, and is communicated with the conductive layer 110.

In an embodiment of this application, the conductive layer 110 may be, for example, a metal layer having low resistivity.

In an embodiment of this application, the light-shielding layer 120 may be, for example, a black matrix layer.

In an embodiment of this application, the conductive layer 110 and the CF layer are disposed adjacent to each other, and surround the first photoresists 131, the second photoresists 132, and the third photoresists 133.

In an embodiment of this application, the first photoresists 131 may be, for example, red photoresists, the second photoresists 132 may be, for example, green photoresists, and the third photoresists 133 may be, for example, blue photoresists.

In an embodiment of this application, the through-holes 123 are configured with equal widths, partly equal widths, or unequal widths.

In an embodiment of this application, the through-holes 123 are located at intersections of photoresists that are adjacent to each other. Specifically, the through-holes 123 are located at intersections of the pixel display areas, that is, at junctions of light-shielding layers 120 in different directions.

In an embodiment of this application, the through-hole design may also be applied to a CF substrate of a four-color photoresist layer. The four-color photoresist layer includes: a first photoresist, a second photoresist, a third photoresist, and a fourth photoresist. The first photoresist may be, for example, a red photoresist. The second photoresist may be, for example, a green photoresist. The third photoresist may be, for example, a blue photoresist. The fourth photoresist may be, for example, a white photoresist, and may be changed to a mixed light-emitting photoresist of a red sub-photoresist, a green sub-photoresist, and a blue sub-photoresist according to demands of design personnel, or the white photoresist may be replaced with another material. An implementable structure is used as an example in this specification, but is not intended to limit the present invention.

Referring to FIG. 5 to FIG. 7, a display panel includes: an active switch array substrate and a CF substrate, where the CF substrate includes: a first substrate 100; a conductive layer 110, disposed on the first substrate 100; a light-shielding layer 120, disposed on the conductive layer 110 and covering the conductive layer 120, where the light-shielding layer 120 includes a plurality of through-holes 123, the through-holes 123 expose the conductive layer 110, and the conductive layer 110 and the light-shielding layer 120 define a plurality of pixel display areas; a CF layer, including a plurality of first photoresists 131, second photoresists 132, and third photoresists 133 that are disposed as an array on the pixel display areas; and a transparent electrode layer 140, disposed on the light-shielding layer 120 and the CF layer, where the transparent electrode layer 140 covers the through-holes 123, and is communicated with the conductive layer 110.

In an embodiment of this application, the conductive layer 110 may be, for example, a metal layer having low resistivity.

In an embodiment of this application, the light-shielding layer 120 may be, for example, a black matrix layer.

In an embodiment of this application, the conductive layer 110 and the CF layer are disposed adjacent to each other, and surround the first photoresists 131, the second photoresists 132, and the third photoresists 133.

In an embodiment of this application, the first photoresists 131 may be, for example, red photoresists, the second photoresists 132 may be, for example, green photoresists, and the third photoresists 133 may be, for example, blue photoresists.

In an embodiment of this application, the through-holes 123 may be configured with equal widths, partly equal widths, or unequal widths.

In an embodiment of this application, the transparent electrode layer 140 is communicated with the conductive layer 110 through the through-holes 123, and covers the CF substrate.

In this application, the transparent electrode layer is communicated with the conductive layer, which, in principle, may be equivalent to parallel connection of resistors. Therefore, a resistance value of the transparent electrode layer may be reduced, and stability of a voltage of the transparent electrode layer is improved, thereby improving display quality.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A method for manufacturing a color filter (CF) substrate, comprising:
   providing a first substrate;
   disposing a conductive layer on the first substrate;
   disposing a light-shielding layer on the conductive layer;
   patterning the light-shielding layer to expose a part of the conductive layer, and forming a light-shielding layer comprising a plurality of recessed portions with different thicknesses on the conductive layer;
   etching the conductive layer and the light-shielding layer to cover the conductive layer with the light-shielding layer, forming a plurality of through-holes in the light-shielding layer, and defining, by the conductive layer and the light-shielding layer, a plurality of pixel display areas;
   disposing a CF layer on the pixel display areas; and
   disposing a transparent electrode layer on the light-shielding layer and the CF layer, wherein
   the transparent electrode layer covers the through-holes, and is communicated with the conductive layer.

2. The method for manufacturing a CF substrate according to claim 1, wherein the conductive layer is etched by using a wet etching method, so that the etched conductive layer is covered with the light-shielding layer.

3. The method for manufacturing a CF substrate according to claim 1, wherein the recessed portions of the light-shielding layer are etched by using a dry etching method to form the through-holes and expose the conductive layer.

4. The method for manufacturing a CF substrate according to claim 1, wherein a plurality of photoresists are disposed as an array on the pixel display areas, and the photoresists comprise first photoresists, second photoresists, and third photoresists, and are the CF layer.

5. The method for manufacturing a CF substrate according to claim 1, wherein the through-holes are arranged as an array between photoresists of a same color.

6. The method for manufacturing a CF substrate according to claim 1, wherein the through-holes are arranged as an array between photoresists of different colors.

7. The method for manufacturing a CF substrate according to claim 1, wherein the light-shielding layer is a black matrix layer.

* * * * *